N. D. LEVIN.
MINING MACHINE.
APPLICATION FILED MAR. 17, 1914.

1,169,842.

Patented Feb. 1, 1916.
5 SHEETS—SHEET 1.

WITNESSES:

INVENTOR.

BY

ATTORNEY.

N. D. LEVIN.
MINING MACHINE.
APPLICATION FILED MAR. 17, 1914.
1,169,842.
Patented Feb. 1, 1916.
5 SHEETS—SHEET 2.
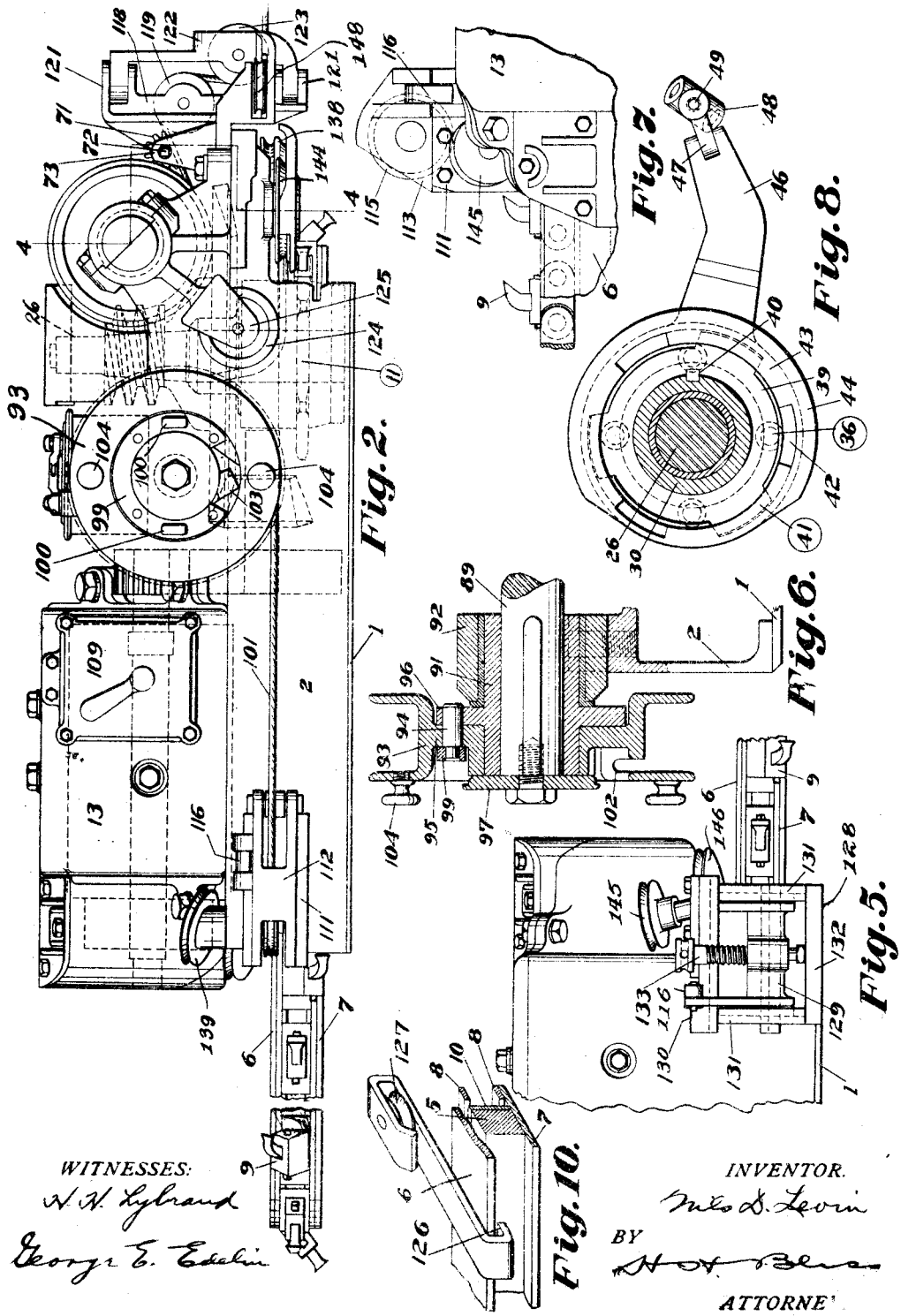
WITNESSES:
N. H. Lyband
George E. Edelin
INVENTOR.
Niles D. Levin
BY
H. H. Bliss
ATTORNEY

N. D. LEVIN.
MINING MACHINE.
APPLICATION FILED MAR. 17, 1914.

1,169,842.

Patented Feb. 1, 1916.
5 SHEETS—SHEET 3.

WITNESSES:
N. H. Lybrand
George E. Edelen

INVENTOR.
Nils D. Levin
BY
H. H. Bliss
ATTORNEY.

N. D. LEVIN.
MINING MACHINE.
APPLICATION FILED MAR. 17, 1914.
1,169,842.
Patented Feb. 1, 1916.
5 SHEETS—SHEET 4.
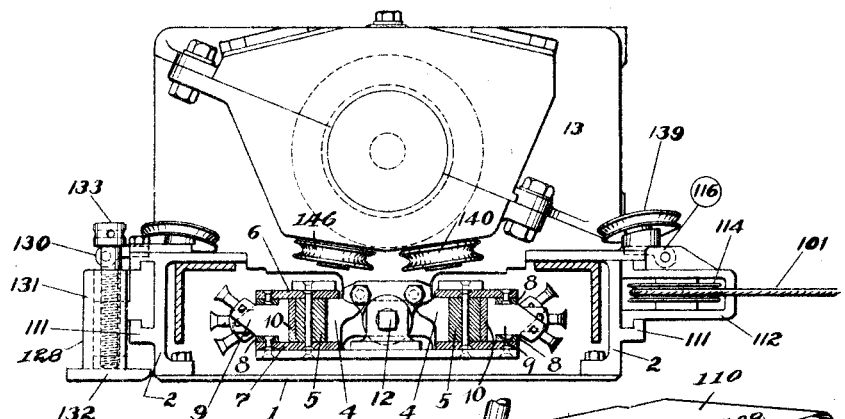
Fig. 9.
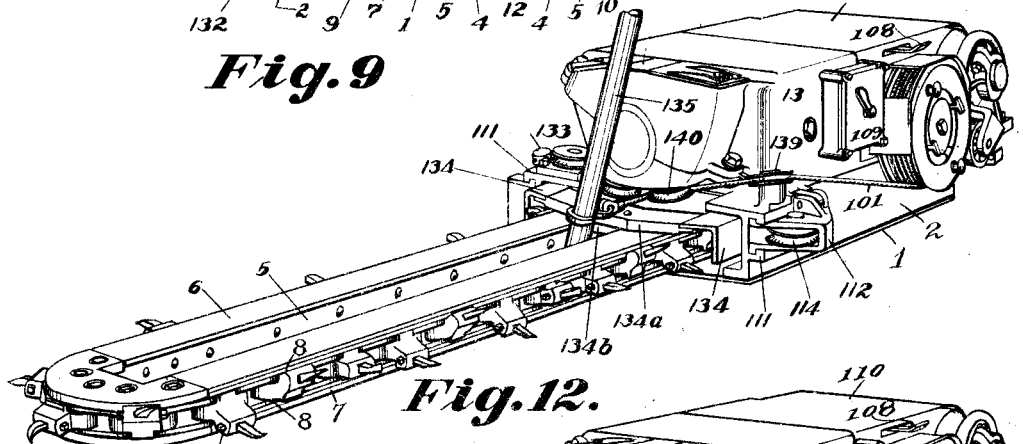
Fig. 12.
Fig. 11.
WITNESSES:
INVENTOR.
BY
ATTORNEY.

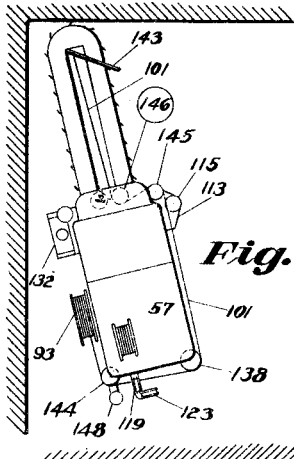
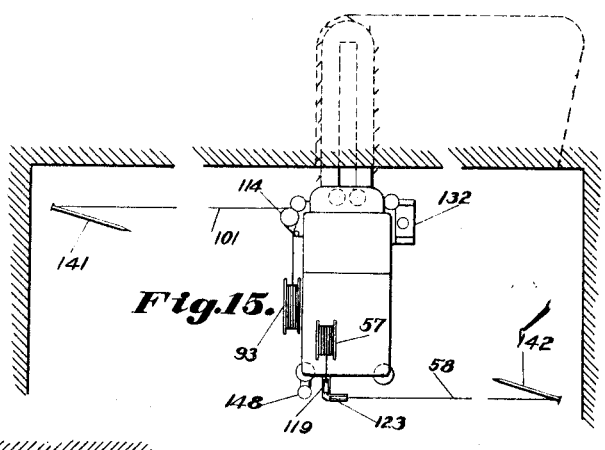
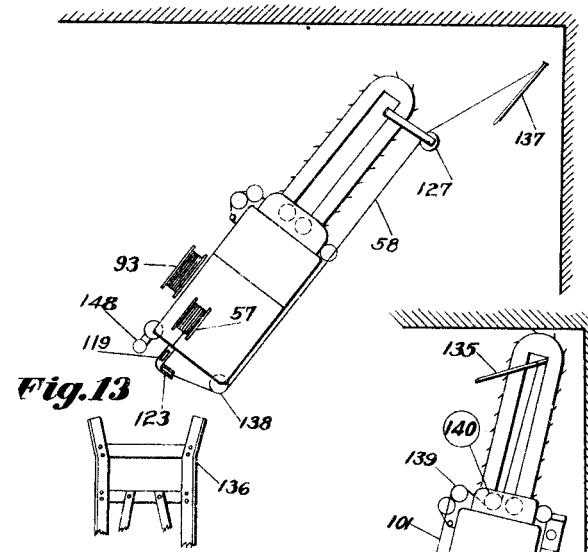
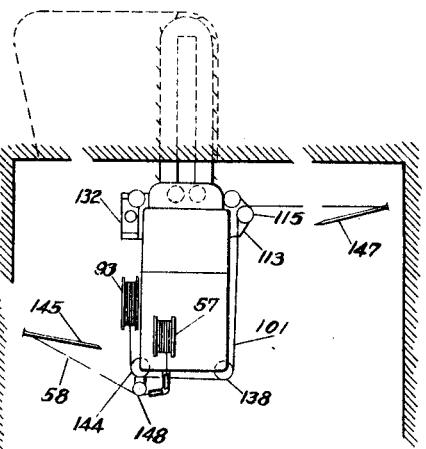
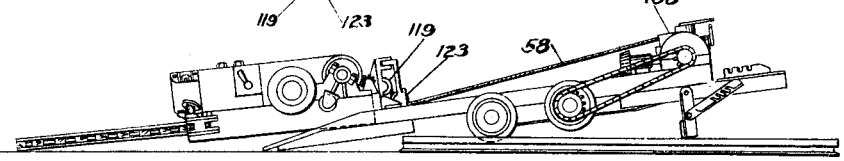

UNITED STATES PATENT OFFICE.

NILS D. LEVIN, OF COLUMBUS, OHIO, ASSIGNOR TO THE JEFFREY MANUFACTURING COMPANY, OF COLUMBUS, OHIO, A CORPORATION OF OHIO.

MINING-MACHINE.

1,169,842.  Specification of Letters Patent.  Patented Feb. 1, 1916.

Application filed March 17, 1914. Serial No. 825,370.

*To all whom it may concern:*

Be it known that I, NILS D. LEVIN, a citizen of the United States, residing at Columbus, in the county of Franklin and State of Ohio, have invented certain new and useful Improvements in Mining-Machines, of which the following is a specification, reference being had therein to the accompanying drawing.

The present invention relates to machines of the side cutting type which are adapted more especially to use in room and pillar systems of mining.

One object of the invention is to provide improved facilities for handling the machine about the working place.

Another object is the provision of improved means for effecting the sumping or entering cut of the machine.

Another object is the provision of improved means adapting the machine for operation in either direction along the face of the coal.

Another object is the provision of improved forms of gearing between the motor and the driven parts of the machine.

Another object is the provision of improved clutch devices for controlling the operation of the driven parts of the machine.

Another object is the provision of an improved construction and arrangement of the motor.

These and other objects are attained in the preferred form of construction which is fully set forth in the following specification and illustrated in the annexed drawings of which—

Figure 1:
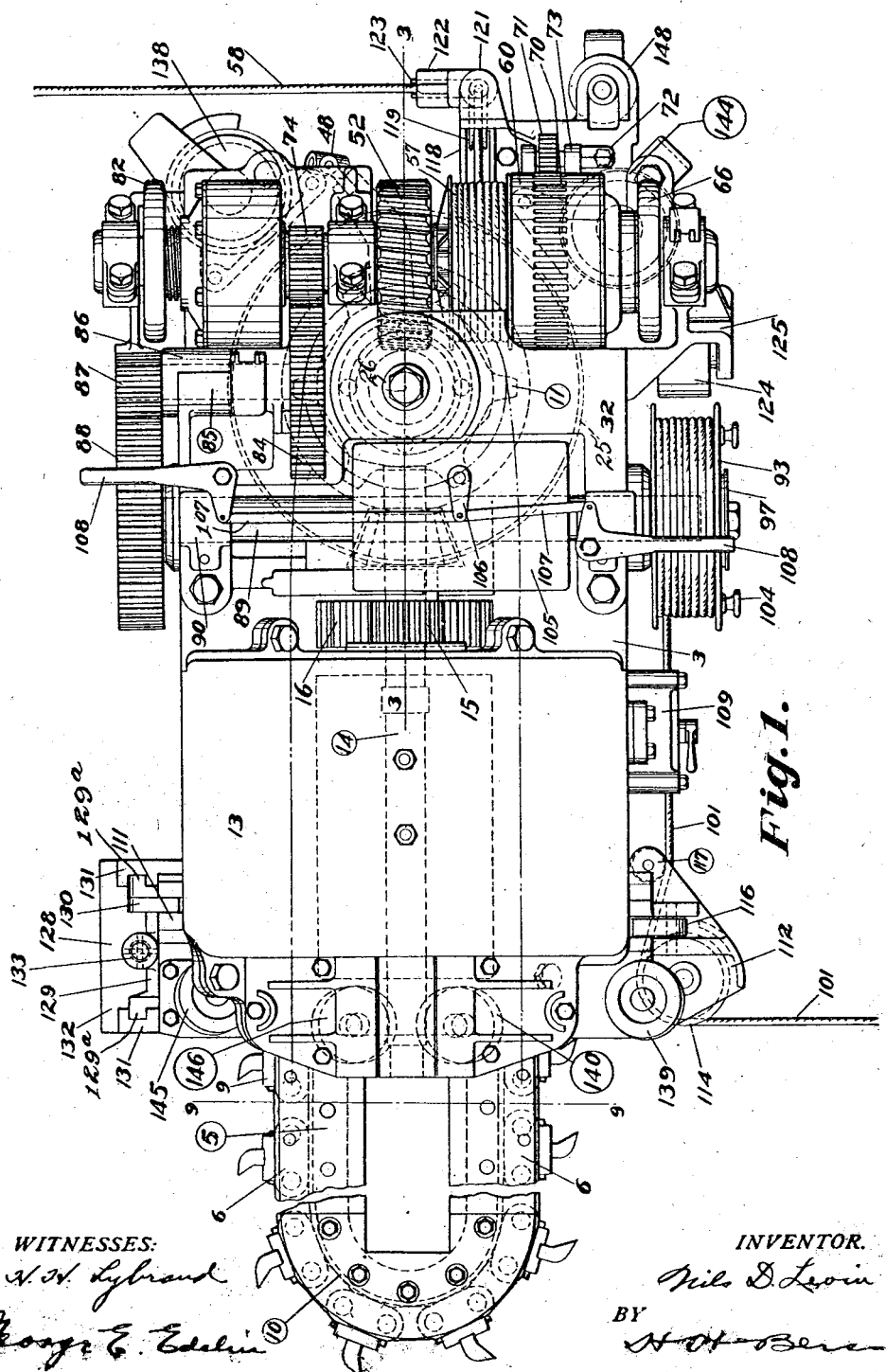
Figure 4:
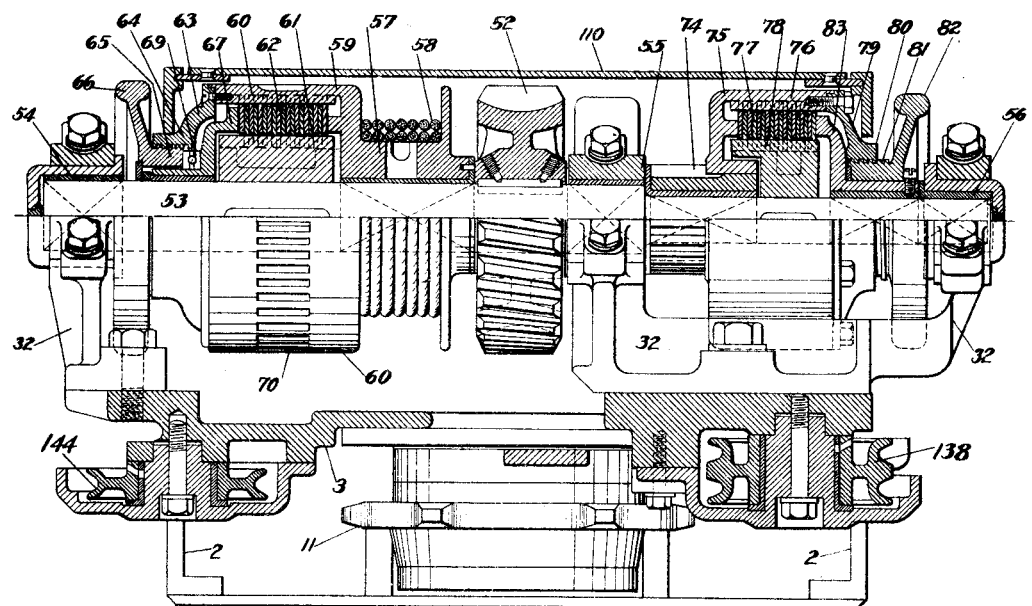
Figure 3:
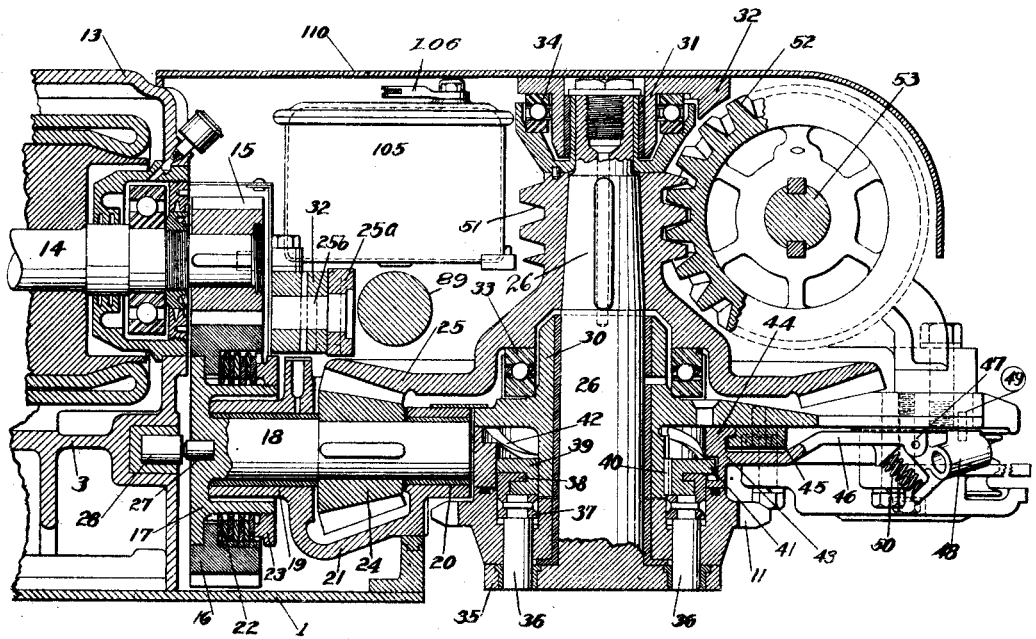

Figure 1 is a general plan view of the machine, the cover being removed from the gearing; Fig. 2 is a left side elevation; Fig. 3 is a longitudinal section of the machine on the line 3—3 of Fig. 1; Fig. 4 is a cross sectional view taken along the line 4—4 of Fig. 2; Fig. 5 is a fragmentary side elevation of the right hand side of the machine showing the application of the tilting shoe; Fig. 6 is a detail section on the center line of the feed drum; Fig. 7 is a detail plan view showing the application of the feed rope sheave to the right hand side of the machine in place of the tilting shoe, preparatory to cutting from left to right; Fig. 8 is a detail plan view showing the details of the clutch by which the cutter chain sprocket is connected to the vertical power shaft; Fig. 9 is a sectional view along the line 9—9 of Fig. 1 looking toward the inner end of the machine frame; Fig. 10 is a detail of the snatch block used in handling the machine; Fig. 11 is a perspective view of the machine showing the arrangement of parts preparatory to beginning the sumping cut; Fig. 12 is a perspective view of the machine showing the arrangement of parts at the completion of the sumping cut, when the machine is to be fed from right to left across the face of the coal; Figs. 13, 14, 15, 16, 17 and 18 are diagrammatic views of the machine in the room of the mine illustrating the operation.

The machine comprises a main base frame, a cutting mechanism projecting from the inner end of the base frame, propelling and guiding devices mounted upon the base frame, a motor mounted upon the base frame, and suitable driving connections between the motor and the propelling and guiding devices, and the cutting mechanism, respectively.

Referring to the construction in detail, the base frame comprises a bottom plate 1, adapted to slide over the floor of the mine, attached to the depending flanges 2, 2 of the bed frame casting 3, upon which the other parts of the machine are mounted. Supported in suitable brackets 4, depending from the underside of the bed frame casting 3, is a cutter frame composed of a steel bar 5, of rectangular cross section, bent into the form of an elongated letter U, and reinforced above and below by plates 6 and 7 to which guide strips 8 are attached to engage the links of the cutter chain 9 to prevent their accidental removal from the guide ways thus formed. The outer surface of the bar 5 is protected by a renewable wearing strip 10 over which the cutter chain 9 slides. An open slot extending longitudinally of the cutter frame between the plates 6 and 7 is provided as a guide for the machine in making the sumping cut, as will hereinafter appear. A sprocket wheel 11 connected to the power elements of the machine, as will presently appear, engages the cutter chain 9 to drive it. Means for the adjustment of the tension of the chain is provided in the adjusting screw 12, adapted to impart a limited longitudinal movement to the cutter frame.

To permit the cutting apparatus to be reversible, the cutter holders are not made in the ordinary way. Each holder for a cutter is formed so as to project in a way suitable to hold the cutter in its socket in whichever way the cutter chain travels. Each of these holders is provided with two cutter-clamping devices, one clamp to engage with the shank of the bit when the chain is moving in one direction and the other to engage with the same shank in the same place when it is reversed, and the chain is moving oppositely. This special provision must be made in these cutter-carrying chains in order to permit reversal of the machine bodily, and allow it to cut from right to left, or vice versa. Ordinarily, the holder blocks on the chain links are specially cut to provide for their working in one direction only, and each is provided with a single clamping device or set screw. But the present machine is, throughout, designed for cutting across the face of a room, either from left to right or from right to left, as is set forth in this description.

The upper surface of the bed frame casting 3 is shaped to form the lower half of the magnetic frame of the motor 13, the armature shaft 14 of which carries a pinion 15 in mesh with a ring gear 16 carried by a gear center 17 formed integral with the shaft 18. The shaft 18 is mounted for rotation in bearings 19 and 20, formed in a casting 21 which is bolted to the base frame casting 3 in a manner to admit of the assembling of the shaft, gears and bearings before placing them in the machine. Interposed between the ring gear 16 and the gear center 17 are friction clutch disks 22 arranged in alternate engagement with suitable keys of the ring gear and gear center, and held in contact by a collar 23 screw threaded to the hub of the gear center 17, the construction providing a safety clutch between the motor and the working parts of the machine. Fixed to the shaft 18 is a bevel pinion 24 adapted to mesh with the master bevel gear 25 attached to the vertical power shaft 26. A roller 25ª, journaled on a suitable stud 25ᵇ, overlies the master gear 25 so as to prevent its springing out of mesh with the pinion 24. The thrust of the bevel pinion 24 is taken by a hardened steel pin 27 inserted into the end of the shaft 18, which bears against a suitable insert 28 in the main frame casting 3. The vertical shaft 26 is journaled near its lower end in a sleeve bearing 30 formed in the main frame casting 3, and at its upper end in a sleeve bearing 31 formed in the yoke casting 32, bolted to the frame. A ball bearing 33 carries the weight of the vertical shaft and master gear and a similar bearing 34 takes the thrust of the gears.

Formed on the lower end of the vertical shaft 26 is a flange 35 upon which is mounted, for free rotation about the vertical shaft, the cutter chain sprocket wheel 11. Both the sprocket wheel 11 and the flange 35 are provided with registering apertures through which may be thrust the pins 36 to drive the sprocket wheel. These pins are secured at their upper ends to a ring 37 having a flange 38 engaging a suitable groove in the ring 39 which is mounted for vertical movement on the outer surface of the sleeve 30, but is held against rotary movement relative thereto by the key 40. Formed on the periphery of the ring 39 are a plurality of lugs 41, each of which engages a spirally inclined groove 42 in the rotatable collar 43. The collar 43 has, formed at its top, a flange 44 which bears for support in suitable flanges of the segments 45 bolted to the under side of the base frame casting 3. An arm 46, formed on the collar 43, affords convenient means for the rotation of the collar, which, by rotation in one direction, lifts the pins 36 out of engagement with the apertures in the flange 35, and, by rotation in the other direction, pushes them into such engagement to drive the cutter chain sprocket. Formed on the outer end of the arm 46 is a hinge 47 by which is connected a sprocket 48 adapted to receive the end of a small crowbar such as is commonly used about such a machine, to form a lever handle for the rotation of the collar 43. The socket 48 carries a pin 49 adapted to engage suitable apertures in the base casting 3, under the pressure of the spring 50, to prevent accidental movement of the arm 46 and the consequent disengagement or engagement of the sprocket. The pin 49 may be disengaged from said apertures by a downward pressure of the hand lever extension bar.

Formed on the hub of the master gear 25 is a worm 51 meshing with a worm wheel 52 attached to a transverse horizontal shaft 53 journaled in the bearings 54, 55 and 56 formed on the yoke casting 32. Mounted for free rotation on the shaft 53 adjacent the worm wheel 52 is a drum 57 upon which may be wound a rope 58 the use of which will be hereinafter set forth. Formed on the flange 59 of the drum 57 is a cylindrical extension 60 constituting the driven member of a friction clutch of the well known multiple disk type. The driving member 61 of this clutch is keyed to the shaft 53 and drives the driven member through a plurality of disks 62 in the manner common to such clutches. Attached to the clutch member 60 by any suitable means such as by machine screws, is a disk 63 having a hub 64 in which is screw threaded the hub 65 of a hand wheel 66. Freely mounted upon the shaft 53 is a pressure member 67 adapted to engage the outermost of the friction disks of the clutch. Interposed between the hub 65 of the hand wheel and the hub of the pressure member is a ball bearing 69 through which pressure may be applied to the pressure member 67 to force the disks into frictional engagement to drive the drum 57. By this device the drum casting 57 and the pressure member 67 are drawn together to compress the friction disks without imparting any thrust to other parts of the machine. Formed on the outer surface of the clutch member 60 are gear teeth 70 adapted to mesh with a pinion 71 mounted on a short shaft 72 journaled in apertures of the lugs 73 formed on the base casting 3. The end of the shaft 73 is square to receive a crank or other convenient wrench by which the drum may be rotated by hand to wind the rope 58.

Mounted for free rotation upon the shaft 53 is a pinion 74 which may be connected to said shaft through a multiple disk friction clutch similar to that just described. The driven member of this clutch is a disk 75 having a cylindrical extension 76 connected, through the friction disks 77, with the driving member 78 keyed to the shaft 53. A disk 79, secured to the cylindrical extension 76 by any suitable means such as machine screws, is provided with a hub 80 in which is screw threaded the hub 81 of a hand wheel 82. A pressure member 83 journaled for free rotation on the shaft 53, is adapted to engage the outermost of the clutch disks and to be forced into contact therewith when the hub 81 is screwed against it by turning the hand wheel 82. By this arrangement pressure may be applied to the disks of the clutch without transmitting thrust to the other parts of the machine. The pinion 74 engages an intermediate gear 84 fixed to the intermediate shaft 85 which is journaled in a bearing 86 formed in the yoke casting 32. Attached to the outer end of the intermediate gear shaft 85 is a pinion 87 which meshes with the feed gear 88 keyed to the feed shaft 89. This feed shaft 89 is journaled adjacent the gear 88 in a bearing 90 formed in the yoke casting, and has fixed at its remote end a sleeve 91 which bears in the journal bearing 92 of the yoke casting (see Fig 6). Journaled on the sleeve 91 outside the bearing 92 is a feed drum 93 adapted to be connected for rotation therewith by a plurality of pins 94 projecting through apertures in the web 95 of the drum to engage with similar apertures in the flange 96 of the sleeve. A disk 97 secured to the end of the shaft 89 holds the drum against axial displacement. The pins 94 are fixed to a ring 99 having convenient finger holds 100 for convenient manipulation. A feed rope 101 is adapted to be wound upon the feed drum 93 and is secured thereto by passing its end through a suitable aperture 102 in the barrel of the drum, after which a suitable nut 103 is affixed to prevent its withdrawal. Convenient knobs 104 are fixed to the flange of the drum for winding and unwinding the rope in the adjustment of the machine preparatory to its work. As there is a considerable drag to the gears and friction clutch through which the feed drum is driven, this manual winding and unwinding of the feed rope would be quite difficult were the pins 94 not disengaged from the flange 96.

Conveniently mounted upon the frame of the machine is a starting box 105 for the control of the motor 13, the handle 106 of which is connected by suitable links 107 with operating levers 108 conveniently placed at each side of the machine. A reverse switch 109 is provided to control the direction of rotation of the armature. The working parts of the machine are protected from injury, by falling fragments from the roof, by a cover plate 110 attached to the frame of the machine.

At the inner corners of the base frame casting 3 are sockets 111 in which may be inserted attachments 112 and 113 having guide sheaves 114 and 115 by which the feed rope 101 is led off to its anchorage when the machine is cutting across the face of the coal (see Figs. 1 and 7). These attachments are secured in place by pivoted latch bars 116 adapted to engage with suitable notches in the base frame casting. In order to prevent too great lateral projections and at the same time insure perfect spooling of the feed rope on the drum 93, an auxiliary roller 117 is provided in the attachment 112 which is adapted to use on the left hand side of the machine. As will presently be explained, the attachment 112 is for use on the left side of the machine when it is cutting from right to left, and attachment 113 is for use on the right side of the machine when it is to cut from left to right.

Attached to the outer end of the main frame casting 3 is a bracket 118 in which is journaled for rotation in a vertical plane, a sheave 119 so positioned that it will guide the handling rope 58 to the center of the drum 57, and insure perfect spooling. The bracket 118 has lugs 121 in which is pivoted for rotation about a vertical axis, a swivel yoke 122 having sheave 123, alined with the sheave 119, by which the rope 58 may be led off in any direction.

When the machine is used to cut from left to right it is desirable to pass the feed rope 101 around the outer end of the machine, and in order that it shall draw properly through the guide sheaves, a roller 124 is journaled in a bracket 125 of the yoke 32 adjacent the feed drum.

Other guide sheaves are disposed about the machine for the guidance of the feed and handling ropes, but these need no further description than to locate them and point out their purpose, which will be done in the description of the operation of the machine.

A snatch block, such as is shown in Fig. 10, comprising a bar, bent at one end to form a hook 126 for attachment to the machine, and at the other end to form a housing for a sheave 127 suitably journaled therein, is provided with the machine for convenience in the manipulation of the rope in handling the machine.

Under some circumstances there is a tendency for the cutting mechanism to climb upward in the coal. To overcome this tendency an attachment 128 is provided, which may be inserted in the socket 111 of the rearward side of the machine. This attachment comprises a body 129 having flanges adapted to engage the socket 111 and a latch 130 for its retention therein (see Figs. 1, 5 and 9). Formed on the body 129 are vertical guides 129ª which engage suitable ways in the upstanding arms 131 of the shoe 132 adapted to contact with the floor of the mine and to slide thereon. An adjusting screw 133, threaded through the body 129, bears on the upper surface of the shoe 132 and tends to lift the rear side of the machine, thereby directing the cutters downward.

During the process of sumping there is great danger to the machine runner from accidental contact with the bits of the cutter chain. To guard against such accidents I have provided a chain guard comprising two angle bars, 134 lying above the cutter chain, their flanges extending downward outside thereof, and adapted to slide longitudinally of the cutter frame along the under side of the main frame casting adjacent the flanges 2. Secured to their inner ends is a cross bar 134ª having a slide 134ᵇ engaging the edges of the plates 6 of the cutter frame to slide thereon, and to prevent the accidental displacement of the bars 134. When the machine is in position to begin the sumping cut (Fig. 11), the cross bar 134ª, and with it the angle bars 134, are drawn out to their full extension, effectually shielding the chain. As the machine advances into the coal, the sumping jack 135 will contact with the cross bar 134ª and push the angle bars 134 under the base of the machine where they will be entirely out of the way while cutting across the face of the room.

The operation of the machine is as follows: The machine, having arrived in the room which is to be cut, and the truck 136 advanced to the desired position for unloading, a jack 137 is placed as in Fig. 13, the handling rope is drawn out from the drum 57, passed around the sheave 138 fixed to the corner of the machine frame, the snatch block is attached to the forward part of the cutter frame and the rope passed around the sheave 127 and attached to the jack. The motor is then started and the hand wheel 66 manipulated to cause the rotation of the drum 57 to wind the rope 58, thereby pulling the machine off the truck and dragging it across the room in the direction of the jack. The machine can thus be placed in any desired position.

When the machine is to be sumped under the coal at the right hand side of the rooms, preparatory to cutting from right to left, it will be placed as in Fig. 14. A jack 135 will be set with its foot projecting through the longitudinal slot in the cutter frame, and the chain guard adjusted as shown in Fig. 11. The feed rope 101 will be drawn out from the drum 93, passed around the sheaves 139 and 140 and attached to the jack. The pins 36 will then be adjusted to cause the sprocket wheel 11 to revolve with the vertical power shaft 26 to drive the cutter chain. The hand wheel 82 will be manipulated to cause the drum 93 to revolve to wind the rope 101, thereby moving the machine to feed the cutter frame longitudinally into the coal.

When the machine is fully sumped the jack 135 will be removed, a jack 141 placed at the left hand side of the room adjacent the coal face (Fig. 15), the feed rope passed around the sheave 114 and attached to the jack. A second jack 142 will be set at the right hand side of the room in alinement with the rear end of the machine and the handling rope 58 drawn out from the drum 57 and attached to this jack. When now the motor is started, the hand wheel 82 is set up to wind the feed rope, and the hand wheel 66 manipulated to cause the friction clutch to exert a winding torque on the drum 57, thus immediately taking up all the slack in the rope 58 and tending to swing the outer end of the machine toward the right. The adjustment of the friction clutch in the drum 57 will be such that the resistance to the advance of the outer part of the machine will balance the resistance of the coal to the progress of the cutting mechanism and thus counteract the tendency of the feed rope to swing the machine to the left. The machine will thus be fed across the room from right to left as shown in Fig. 15.

While undercutting along the face of the coal it becomes desirable at times to positively swing the outer end of the machine rearward so as to quickly change the angle of the machine to the coal face. Thus in case a hard deposit in the coal is encountered, it may be desirable to swing the machine so that the cutters may engage the coal or obstruction along more advantageous lines of attack to effect the cutting through or dislodgment of the obstruction. In any such case this rearward swinging of the outer end of the machine can readily be effected by simply tightening up on the hand wheel 66 until the friction disks 62 seize and clutch the drum 57 to the shaft 53. Thereupon the drum 57 is turned in the direction to wind in the rope 58 and the rearward swinging of the outer end of the machine is quickly accomplished. Furthermore, when it is considered that the two clutch hand wheels 66 and 82 can each be set in an infinite number of positions ranging from that at which its clutch disks move freely in relation to each other to that in which the friction between the disks is increased until the disks seize and stop relative movement, it will be understood that by suitable manipulation of the two hand wheels the tension in the feed rope 101 can be varied as desired to control the rate of feed and, at the same time, the tension in the tail rope 58 can be varied as desired so as to maintain the machine at any desired angle to the face of the coal. In this connection it will be observed that it is impossible for the operator to overload the machine to the point of breakage by setting up either of the clutch hand wheels because all parts of the machine are driven from the motor through the safety clutch 22.

When the machine has finished the cut across the face of the coal, the jacks 141 and 142 will be removed, the feed rope wound up to be out of the way, and the handling rope 58 attached to the truck 136 to pull the machine to and onto it for transportation to another room, as illustrated in Fig. 16. In dragging the machine over the mine floor and loading it upon the mine truck, the operator has a nice and convenient control of the machine by means of the clutch 62, this control being especially advantageous in the loading of the machine.

Should it be desired to feed the machine from left to right, instead of as just described, the bits of the cutter chain will be reversed in their sockets to cut when the chain is traveling in the reversed direction, the reverse switch thrown to reverse the direction of rotation of the armature of the motor, the attachment 113 substituted for the attachment 128 on the right side of the machine and the attachment 128 for the attachment 112 on the other side of the machine, the machine placed at the left hand side of the room and the jack 143 set with its foot extending through the longitudinal slot of the cutter frame, as illustrated in Fig. 17, the feed rope passed across the outer end of the machine over sheaves 144, 138, 145 and 146, and attached to the jack 143. When now the chain guard is adjusted and the motor started, the operation will proceed as before described.

After the completion of the sumping cut, the jack 143 will be removed, a jack 147 set at the right hand side of the room, the feed rope 101 passed around the sheaves 144, 138 and 115 and attached to the jack 147. A jack 145 will be set near the left hand side of the room, the rope 58 drawn out and attached thereto and thereupon the operation of undercutting along the face will proceed as before. A sheave 148 attached to the frame of the machine insures sufficient clearance between the rope 58 and the hand wheel 66 while cutting from left to right, and also guides the rope to the snatch block when the machine is being pulled toward the left hand side of the room.

What I claim is:—

1. In a mining machine, the combination of a main frame, cutting apparatus having reversible cutters projecting from the inner end of said frame, a winding drum mounted at one side of the main frame with its axis disposed transversely thereof, a propelling cable having one of its ends connected to the winding drum, cable guide devices at each side of the main frame near the inner end thereof and auxiliary cable guide devices on the main frame whereby the propelling cable can be passed from the winding drum to the guide devices at either inner corner of the main frame and thence away toward the right or left to a fixed abutment so as to exert a draft either toward the right or toward the left on the inner end of the main frame, a motor on the main frame to drive the said winding drum and the cutting apparatus, means for reversing the direction in which the cutting apparatus is driven by the motor, and means adapted to exert a retarding draft on the outer end of the main frame either toward the left or toward the right.

2. In a mining machine, the combination of a main frame, cutting apparatus having reversible cutters projecting from the inner end of said frame, a winding drum mounted on the main frame, a propelling cable connected to the drum, attachment securing devices at each side of the main frame near the inner end thereof, guide attachments for the propelling cable and a vertically adjustable ground shoe attachment constructed to fit the said securing devices interchangeably whereby a cable guide attachment may be secured at either inner corner of the frame and the adjustable shoe attachment at the opposite inner corner of the frame, a motor for driving the cutting apparatus and the winding drum, means for reversing the direction in which the cutting apparatus is driven by the motor, and means adapted to exert a retarding draft on the outer end of the main frame either toward the left or toward the right.

3. In a mining machine, the combination of a main frame, cutting apparatus projecting from the inner end thereof, a propelling cable arranged to exert a forward draft on the inner end of the main frame, a winding drum on the main frame to which the said cable is connected, a retarding cable arranged to exert a rearward draft on the outer part of the main frame, a second winding drum mounted on the main frame to which the last named cable is connected, a motor on the main frame and transmission gearing interposed between the motor and two winding drums comprising a manually controllable friction clutch through which the power is transmitted to the winding drum of the propelling cable, a second manually controllable friction clutch through which the power is transmitted to the retarding cable winding drum, and a safety device interposed between the said friction clutches and the motor adapted to yield when the transmission of power exceeds a certain rate.

4. In the mining machine, the combination of a main frame, an endless chain cutting apparatus projecting from the inner end thereof, propelling devices comprising a draft cable and winding drum on the main frame for advancing the machine along the face of the coal, guide devices on the main frame for exerting a retarding draft on the outer part thereof comprising a cable and winding drum, a motor mounted on the inner end of the main frame, a main vertical shaft journaled in the outer end of the main frame, a sprocket wheel engaging the cutter chain mounted on the lower end of the vertical shaft, driving connections between the motor and the vertical shaft, and driving connections between the vertical shaft and the propelling devices and guiding devices, respectively, comprising a shaft mounted transversely of the main frame on the outer end thereof, a manually controlled friction clutch on said shaft for controlling the transmission of power to the propelling devices, and a second manually controlled friction clutch on the said shaft for controlling the transmission of power to the guide devices.

5. In a mining machine, the combination of a main frame, cutting apparatus projecting from the inner end thereof, propelling devices on the main frame for exerting a forward draft on the inner end thereof, retarding devices on the main frame for exerting a rearward draft on the outer part thereof, a motor mounted on the inner end of the main frame, driving connections between the motor and the cutting apparatus, and driving connections between the motor and the propelling and retarding devices, respectively, comprising a shaft mounted transversely of the main frame on the outer end thereof, a manually controlled clutch on said shaft for controlling transmission of power to the propelling devices, and a second manually controlled friction clutch on the said shaft for controlling transmission of power to the retarding devices.

6. The combination of the main frame arranged to be moved bodily laterally while in operation, the motor on the inner end of the frame, the vertical shaft behind the motor, the outer horizontal transverse shaft behind the vertical shaft, the inner horizontal transverse shaft between the motor and the vertical shaft, the gearing connecting the motor with the vertical shaft, the gearing connecting the vertical shaft with the outer horizontal shaft, the cable drum on the outer horizontal shaft, the cable drum on the inner horizontal shaft, and two sets of independent manually controlled friction connecting devices on the outer horizontal shaft adapted to transmit power from the last said shaft to the outer drum and to the inner drum, and the cables respectively connected to the said drums.

7. The combination of the main frame arranged to be moved bodily laterally while in operation, the motor on the inner end of said frame, the cutter frame held rigidly in alinement with the main frame and projecting inward therefrom, the vertical shaft behind the motor, the intermediate power transmitting gearing between the shaft and the motor, the outer transverse horizontal shaft behind the vertical shaft, the winding drum behind the vertical shaft, the winding drum at the side of the machine, power transmitting devices between said outer transverse shaft and both of said drums, the two separate manually controlled friction drivers on the last said shaft for transmitting power to the said drums respectively, and the cables secured to the drums respectively, one for feeding the machine laterally along the coal face and the other for controlling and guiding the machine, substantially as set forth.

8. The combination of the main frame, adapted to be moved bodily laterally when in operation, the forwardly projecting cutting apparatus held permanently in alinement with the longitudinal lines of the main frame, the motor on the inner end of the main frame having a longitudinally arranged armature shaft, the vertical shaft behind the motor geared to the armature shaft, the outer transverse horizontal shaft, the worm gearing connecting the vertical shaft and said horizontal shaft, the inner transverse horizontal shaft between the vertical shaft and the motor, the gearing connecting the inner and the outer horizontal shafts, the cable drum on the inner horizontal shaft in vertical planes adjacent those of the side of the machine, the cable drum on the outer horizontal shaft, and the two independent friction transmitters on the outer horizontal shaft, each connected with the driving devices of one of said cable drums.

9. The combination of the main frame adapted to be bodily moved laterally while in operation, the electric motor on the inner end of said frame, the main vertical shaft behind the motor having a master gear wheel connected to the motor, a worm at its upper end, and a chain wheel at its lower end, the outer horizontal transverse shaft behind the vertical shaft having the worm wheel engaging said worm, the friction actuated drum, the friction actuated gear wheel, and the manually controlled friction clutches for the said drum and gear wheel all disposed axially upon the said horizontal shaft, the cable drum in front of said shaft, and the gearing interposed between the friction actuated gearing on the horizontal shaft and the cable drum, substantially as set forth.

10. The combination of the main frame, the cutter frame rigid with and projecting forward from the main frame, the chain cutter thereon, the motor on the frame, the cable drum, the power devices between the motor and the cable drum, the cable guides at the outer corners of the frame, the cable guide at the inner corner of the frame, the cable guide in front of the motor approximately in the central vertical longitudinal planes of the machine, the cable secured to the drum and adapted to be passed either around the guides at the outer corners of the frame or passed forward around the guide at one of the inner corners of the frame and thence away to a stationary abutment or thence to said front central guide, substantially as set forth.

11. The combination of the main frame, the cutter frame rigid with and projecting forward from the main frame, the chain cutter thereon, the motor, on the frame, the cable drum, the power devices between the motor and the cable drum, the cable guides at the outer corners of the frame, the cable guides one at each inner corner of the frame, the two cable guides in front of the motor and approximately in the central vertical longitudinal planes of the machine, the cable secured to the drum and adapted to be passed either around the guides at the outer corners of the frame and thence forward to the front corner guide and thence around one of the front central guides or passed from the drum forward to the opposite inner corner guide and thence to one of the front central guides, substantially as set forth.

In testimony whereof, I affix my signature, in presence of two witnesses.

NILS D. LEVIN.

Witnesses:
P. J. HENRY,
DUDLEY T. FISHER.